United States Patent
Cai et al.

(10) Patent No.: US 7,637,960 B2
(45) Date of Patent: Dec. 29, 2009

(54) SHORT AND THIN SILICON CANTILEVER WITH TIP AND FABRICATION THEREOF

(75) Inventors: Chengzhi Cai, Houston, TX (US); Chi-Ming Yam, Stafford, TX (US); Guoting Qin, Houston, TX (US); Steven Pei, Houston, TX (US); Qingkai Yu, Houston, TX (US)

(73) Assignee: University of Houston, Houston, TX (US)

( * ) Notice: Subject to any disclaimer, the term of this patent is extended or adjusted under 35 U.S.C. 154(b) by 387 days.

(21) Appl. No.: 11/599,726

(22) Filed: Nov. 15, 2006

(65) Prior Publication Data

US 2007/0125160 A1 Jun. 7, 2007

Related U.S. Application Data

(60) Provisional application No. 60/736,924, filed on Nov. 15, 2005.

(51) Int. Cl.
*G12B 21/08* (2006.01)
(52) U.S. Cl. .............................. 850/40; 73/105; 850/59; 977/863; 977/879
(58) Field of Classification Search .................. 73/105; 216/11; 438/52; 850/40, 56–57, 59; 977/724, 977/732, 863, 875, 878–879
See application file for complete search history.

(56) References Cited

U.S. PATENT DOCUMENTS 5,393,647 A * 2/1995 Neukermans et al. ..... 850/57 X
5,729,026 A * 3/1998 Mamin et al. ............ 250/492.2

(Continued)

FOREIGN PATENT DOCUMENTS

EP 413040 B1 * 12/1992

(Continued)

OTHER PUBLICATIONS

Takano, et al., "Chemical and Biochemical Analysis Using Scanning Force Microscopy," Chem Rev. (1999), vol. 99,No. 10,pp. 2845-2880.

(Continued)

*Primary Examiner*—Thomas P Noland
(74) *Attorney, Agent, or Firm*—Winstead PC (57) ABSTRACT

Thin and short cantilevers possess both a low force constant and a high resonance frequency, thus are highly desirable for atomic force microscope (AFM) imaging and force measurement. According to some embodiments, the invention provides small silicon (Si) cantilevers integrated with a Si tip, for example fabricated from SOI wafers that are used for reducing the variation of thickness of the cantilevers. In one example, the fabrication process provided SOI chips containing 40 silicon cantilevers integrating with an ultra-sharp Si tip. The resolution of images obtained with these tips was much higher than those obtained with the commercial tips, while the force constants were much less, that is, more suitable for imaging soft samples. The availability of such SOI chips greatly facilitates large scale modification of the surfaces of the silicon cantilever tips with a monolayer of oligo (ethylene glycol) derivatives that resist the non-specific interactions with proteins, rendering them most suitable for imaging and measurement of biological samples.

19 Claims, 4 Drawing Sheets

U.S. PATENT DOCUMENTS

| | | | | |
|---|---|---|---|---|
| 5,856,672 | A | * | 1/1999 | Ried .............................. 850/9 |
| 6,066,265 | A | * | 5/2000 | Galvin et al. .................. 216/2 |
| 6,075,585 | A | * | 6/2000 | Minne et al. .................. 355/71 |
| 6,198,300 | B1 | * | 3/2001 | Doezema et al. ........ 977/879 X |
| 7,260,980 | B2 | * | 8/2007 | Adams et al. .............. 73/31.05 |
| 7,340,944 | B2 | * | 3/2008 | Beyder et al. .................. 73/105 |
| 7,368,305 | B2 | * | 5/2008 | van der Weide et al. ....... 438/20 |
| 7,461,543 | B2 | * | 12/2008 | Degertekin .................. 73/105 |
| 2004/0213910 | A1 | * | 10/2004 | Cai et al. .................... 427/299 |
| 2005/0017171 | A1 | * | 1/2005 | Samuelson et al. .......... 250/306 |
| 2005/0236566 | A1 | * | 10/2005 | Liu .......................... 73/105 X |

FOREIGN PATENT DOCUMENTS

| | | | |
|---|---|---|---|
| EP | 588888 | B1 * | 1/1997 |
| EP | 1111426 | A2 * | 6/2001 |
| JP | 11271015 | A * | 10/1999 |
| WO | WO 9221135 | A1 * | 11/1992 |
| WO | WO 9429894 | A1 * | 12/1994 |
| WO | WO 9603641 | A1 * | 2/1996 |

OTHER PUBLICATIONS

Poggi, et al., "Scanning Probe Microscopy," Anal. Chem, vol. 74, No. 12, pp. 2851-2862, Jun. 2002.

Hoh, et al., "Quantized Adhesion Detected With the Atomic Force Microscope," 114 J. Am. Chem. Soc. (1992), pp. 4917-4918.

Zlatanova, et al., "Single Molecule Force Spectroscopy in Biology Using the Atomic Force Microscope," 74 Prog. Biophys. & Mol. Biol. (2000), 37-61.

Willemsen, et al., "Biomolecular Interactions Measured by Atomic Force Microscopy", Biophys. J. 3267-3281, vol. 79(6), Dec. 2000.

Nakagawa, et al., "Discriminating Molecular Length of Chemically Adsorbed Moleclues . . . ," 32 Jpn. J. Appl. Phys. Part 2-, No. 2B, L294-L296, Feb. 1993.

Noy, et al., "Chemical Force Microscopy," 27 Annu. Rev. Mater. Sci. (1997), pp. 381-421.

Hugel, et al., "The Study of Molecular Interactions by AFM Force Spectroscopy," Macromol. Rapid Commun. (2001), 22, No. 13, 989-1016.

Janshoff, et al., "Force Spectroscopy of Molecular Systems—Single Molecule . . . ," 39 Angew. Chem.-Int. Edit. (2000), pp. 3212-3227.

Moy, et al., "Intermolecular Forces and Energies Between Ligands and Receptors," 266 Science, pp. 257-259, Oct. 1994.

Hinterdorfer, et al., "Detection and Localization of Individual Antibody-Antigen . . . ," 93 Proc. Natl. Acad. Sci. U.S.A. 3477-3481, Apr. 1996.

Hinterdorfer, et al., "Surface Attachment of Ligands and Receptors . . . ," 23 Colloids & Surf. B-Biointerfaces (2002), 115-123.

Raab, et al., "Antibody Recognition Imaging by Force Microscopy," 17 Nat. Biotechnol., pp. 902-905, Sep. 1999.

Sielert-Badt, et al., "Single Molecule Recognition of Protein Binding . . . ," Biophys. J., vol. 82(5),2767-2774,May 2002.

Noy, et al., "Stretching and Breaking Duplex DNA by Chemical Force Microscopy," 4 Chem. & Biol., pp. 519-527, Jul. 1997.

Clausen-Schaumann, et al., "Mechanical Stablity of Single DNA Molecules," Biophys. J., vol. 78(4), 1997-2007, Apr. 2000.

Schumakovitch, et al., "Temperature Dependence of Unbinding Forces . . . ," Biophys. J. 517-521, vol. 82(1), Jan. 2002.

Xu, et al., "Retrieval and Amplification of Single-Copy Genomic DNA from a Nanometer . . . ," Biochem. & Biophys. Res. Commun. (1998), pp. 744-748 vol. 248, No. 3.

Grandbois, et al., "How Strong Is A Covalent Bond?," Science, vol. 283, Issue 5408, pp. 1727-1730, Mar. 1999.

Rief, et al., "Reversible Unfolding of Individual Titin Immunoglobulin Domains by AFM," Science 1109-1112, vol. 276, Issue 5315, May 1997.

Oberdorfer, et al., "Conformational Analysis of Native Fibronectin . . . ," Langmuir (2000), vol. 16, No. 26, pp. 9955-9958.

Muller, et al., "Conformations, Flexibility, and Interactions Observed on Individual Membrane Proteins by Atomic Force Microscopy ," 68 Meth. Cell Bio. (2002), pp. 257-299.

Fisher, et al., "Stretching Single Molecules into Novel Conformations . . . ," Nat. Struct. Biol., vol. 7,No. 9, Sep. 2000 pp. 719-724.

Johnson, et al., "Surface Energy and the Contact of Elastic Solids," 324 Proc. R. Soc. London A, (1971), pp. 301-313.

Stevens, et al., "Computer Modeling of Atomic Force Microscopy Force Measurements: Comparisons . . . ," Langmuir (1999), pp. 207-213 vol. 15,No. 1.

Lo, et al., "Specific Interactions Between Biotin and Avidin Studied by Atomic Force Microscopy . . . ," Langmuir (1999), pp. 1373-1382 vol. 15,No. 4.

Sekiguchi, et al., "Non-Destructive Force Measurement in 'Liquid Using Atomic Force Microscope," 188 Appl. Surf. Sci. (2002), pp. 489-492.

Hafner, et al., "Structural and Functional Imaging with Carbon Nanotube AFM Probes," 77 Prog. Biophys. & Mol. Biol. (2001), 73-110.

Snow, et al., "Atomic force Microscopy Using Single-Wall C Nanotube Probes," 20 J. Vac. Sci, Technol. B,vol. 20,No. 3,822-827, May,Jun. 2002.

Wong, et al., "Covalently-Functionalized Single-Walled Carbon Nanotube Probe Tips . . . ," J. Am. Chem. Soc. (1998), vol. 120,No. 33, pp. 1997-1998.

Wong, et al., "Covalently Functionalized Nanotubes as Nanometre-Sized Probes in Chemistry and Biology.," 394 Nature 52-55, Jul. 1998.

Vickery, et al., "Scanning Near-Field Fluorescence Resonance Energy Transfer Microscopy," 76 Biophys. J. 1812-1818, Apr. 1999.

Vickery, et al., "Combining AFM and FRET for High Resolution Fluorescence Microscopy," J. Microscopy 408-412, May 2001,vol. 202,Pt. 2.

Shubeita, et al., "Local Fluorescent Probes for the Fluorescence Resonance Energy . . . ," Appl. Phys. Lett. 2625-2627,Apr. 2002,vol. 80,No. 15.

Grayson, et al., "Synthesis and Surface Functionalization of Aliphatic Polyether Dendrons," J. Am. Chem. Soc. (2000)vol. 122,No. 42, pp. 10335-10344.

Deng, et al., "An Efficient Convergent Synthesis of Novel Anisotropic Absorbates Based . . . ," J. Org. Chem. (2002), vol. 67,No. 15,pp. 5279-5283.

Harder, et al., "Molecular Conformation in Oligo (ethylene Glycol)-terminated Self-Assembled . . . ," J. Phys. Chem. B (1998), vol. 102,No. 2, pp. 426-436.

Xiao, et al., Formation of Robust Mesoscopic Ring Structures by Self-Assembly . . . , Chem. Commun. (2001), pp. 1442-1443.

Xiao, et al., "The first Organosiloxane Thin Films Derived from SiC13-Terminated Dendrons . . . ," Langmuir 7728-7739 (2002), vol. 18,No. 20.

Mansfield, et al., "Surface Adsorption of Model Dendrimers," 37 Polymer (1996), vol. 37,No. 17,pp. 3835-3841.

Yao, et al., "Facile Convergent Route to Molecular Caltrops," J. Org. Chem (1999), vol. 64, No. 6, pp. 1968-1971.

Rukavishnikov, et al., A Tower-Shaped Prototypic Molecule Designed as an Atomically Sharp Tip . . . , 40 Tetrahedron Lett. (1999), pp. 6353 to 6356.

Li, et al., "Visualization and Characterization of Poly(amidoamine) Dendrimers . . . ," Langmuir (2000), vol. 16,No. 13,5613-5616.

Tokuhisa, et al., "Preparation and Characterization of Dendrimer Monolayers . . . ," J. Am. Chem., Soc. (1998), vol. 120,No. 18,pp. 4492-4501.

Ulman, "Formation and Structure of Self-Assembled Monolayers," Chem. Rev. (1996), vol. 96,No. 4,pp. 1533-1554.

Linford, et al., "Alkyl Monolayers on Silicon Prepared from 1-Alkenes and Hydrogen-Terminated . . . ," (1995), J. Am. Chem. Soc. vol. 117, No. 11 3145-3155.

Kidoaki, et al., "Adhesion Forces of the Blood Plasma Proteins on Self-Assembled . . . ," Langmuir 7639 (1999), vol. 15,No. 22, 7639-7646.

Ortega-Vinuesa, et al., "Molecular Packing of HSA, IgG, and Fibrinogen Adsorbed on Silicon by AFM Imaging," 324 Thin Solid Films (1998), pp. 257-273.

Veiseh, et al., "Highly Selective Protein Patterning on Gold-Silicon Substrates for Biosensor Applications," Langmuir (2002), vol. 18,No. 17,pp. 6671-6678.

Marrian, et al., "Low-Voltage Electron-Beam Lithography in Self-Assembled Ultrathin . . . ," Appl. Phys. Lett. 390-392, vol. 64,No. 3, Jan. 1994.

Sugimura, et al., "Scanning Probe Nanofabrication of Chemically Active Areas . . . ," J. Vac. Sci. Technol. B 1394-1397, vol. 15,No. 4,Jul./Aug. 1997.

Sugimura, et al., "Nanoscale Patterning of an Organosilane Monolayer on the Basis . . . ," J. Vac. Sci. Technol. B 4140-4143, vol. 14,No. 6, Nov./Dec. 1996.

Sigal, et al., "A Self-Assembled Monolayer for the Binding and Study of Histidine-Tagged Proteins . . . ," Anal. Chem. 490-497,vol. 68,No. 3,Feb. 1996.

Dittrich, et al., "Photobleaching and Stablization of Fluorophores Used for Single-Molecule Analysis . . . ," 73 Appl. Phys. B (2001), 829-837.

Maher, et al., "Single Molecule Photo-Bleaching Observed by Surface Enhanced Resonant . . . ," 352 Chem. Phys. Lett 378-384, Feb. 2002.

Hamann, et al., "Near-Field Fluorescence Imaging by Localized Field Enhancement Near a Sharp Probe Tip," Appl. Phys Lett., vol. 76, No. 14 pp. 1953-1955.

Azoulay, et al., "Quenching and Enhancement of Single-Molecule Fluorescence . . . ," 51 Europhys. Lett. 374-380, Aug. 2000.

Yakovleva, et al., "Microfluidic Enzyme Immunoassay Using Silicon Microchip with Immobilized Antibodies . . . ," Anal. Chem. 2994 to 3004, vol. 74, No. 13, Jul. 2002.

Leoni, et al., "Nanoporous Platforms for Cellular Sensing and Delivery" 2002 Sensors 2, pp. 111-120.

Sharma, et al., "Ultrathin Poly(ethylene glycol) Films for Silicon-Based Microdevices," 206 Appl. Surf. Sci. (2003), pp. 218-229.

Lee, et al., "Protein-Resistant Coatings for Glass and Metal Oxide Surfaces Derived . . . ," 19 Biomaterials (1998), pp. 1669-1675.

Papra, et al., "Characterization of Ultrathin Poly(Ethylene Glycol) Monolayers on Silicon Substrates," Langmuir (2001), vol. 17, No. 5,pp. 1457-1460.

Zhu, et al., "Grafting of High-Density Poly(Ethylene Glycol) Monolayers on Si(111)," Langmuir (2001), vol. 17,No. 25,pp. 7708-7803.

Cicero, et al., "Photoreactivity of Unsaturated Compounds with Hydrogen-Terminated Silicon (111)," Langmuir (2000), vol. 16, No. 13, pp. 5688-5695.

Buriak, Organometallic Chemistry on Silicon and Germanium Surfaces, Chem. Revs., vol. 102, No. 5, 1272-1308, May 2002.

Strother, et al., "Synthesis and Characterization of DNA-Modified Silicon (111) Surfaces," J. Am. Chem. Soc. (2000), vol. 122,No. 6,1205 to 1209.

Stewart, et al., "Photopatterned Hydrosilylation on Pourous Silicon," 37, No. 23 Angew. Chem. Int. Ed. (1998), pp. 3257-3260.

Sieval, et al., "Amino-Terminated Organic Monolayers on Hydrogen-Terminated Silicon Surfaces," Langmuir (2001), vol. 17,No. 24,pp. 7554-7559.

Nivens, et al, "Photoactive Poly(Ethylene Glycol) Organosilane Films for Site-Specific Protein Immobilization," Langmuir (2002), vol. 18,No. 2,pp. 499-504.

Boukherroub, et al., "Controlled Functionalized and Multistep Chemical Manipulation . . . ," J. Am. Chem. Soc. (1999), vol. 121,No. 49,11513-11515.

Sieval, et al., "An Improved Method for the Preparation of Organic Monolayers of I-Alkenes . . . ," Langmuir (1999), vol. 15,No. 23,pp. 8288-8291.

Yam, et al., "Modification of Silicon AFM Cantilever Tips with an Oligo (Ethylene Glycol) Derivative . . . ," J. Am. Chem. Soc. (2003), vol. 125,No. 25,7498-7499.

Fischer, et al., "Amphiphilic Liquid-Crystalline Networks—Phase Behavior and Alignment . . . ," 16 Macromol. Rapid Commun. (1995), pp. 435-447.

Prime, et al., "Adsorption of Proteins onto Surfaces Containing End-Attached Oligo(Ethylene Oxide): A Model . . . ," J. Am. Chem. Soc. (1993), vol. 115,No. 23,pp. 10714-10721.

Harder, et al., "Molecular Conformation in Oligo(Ethylene Glycol)-Terminated Self-Assembled . . . ," J. Phys. Chem. B (1998), vol. 102,No. 2, 426-436.

Snyder, et al., "Temperature and Phase Behavior of Infrared Intensities: The Poly(methylene) Chain," J. Phys. Chem. 5623 ( 1986), vol. 90,No 22,pp. 5623-5630.

Vanderah, et al., "Self-Assembled Monolayers of Methyl 1-Thiahexa (ethylene oxide) . . . ," Langmuir (2002), vol. 18, No. 12, 4674-4680.

Sieval, et al., "Molecular Modeling of Covalently Attached Alkyl Monolayers on the Hydrogen-Terminated . . . ," Langmuir (2001), vol. 17,No. 7,2172-2181.

Zhu, et al., "Chain-Length Dependence of the Protein and Cell Resistance of Oligo(Ethylene . . . ," 56 J. Biomed. Mater. Res. (2001), pp. 406-416.

Campbell, et al., "Low-Frequency Raman-Active Modes in a-Methyl, w-Hydroxyollgo (Oxyethylene)s," J. Phys. Chem. (1991), vol. 95,No. 12,pp. 4647-4651.

Selve, et al., "Monodisperse Perfluoro-Polyethoxylated Amphiphilic Compounds . . . ," Tetrahedron (1991), vol. 47,No. 3, 411-428.

Hines, "The Picture Tells the Story: Using Surface Morphology to Probe Chemical Etching Reactions," Int. Revs. Phys. Chem. (2001), vol. 20,No. 4,645-672.

Wade, et al., "Etch-Pit Initiation by Dissolved Oxygen on Terraces of H-Si (111)," Appl. Phys. Lett. 1679-1681, vol. 71,No. 12,Sep. 1997.

* cited by examiner

SHORT AND THIN SILICON CANTILEVER WITH TIP AND FABRICATION THEREOF

CROSS-REFERENCES TO RELATED APPLICATIONS

This application claims the benefit of U.S. Provisional Application No. 60/736,924, filed Nov. 15, 2005. The present application is related to U.S. application Ser. No. 10/742,047, filed on Dec. 19, 2003, and published on Oct. 28, 2004. U.S. application Ser. No. 10/742,047 is hereby incorporated herein by reference.

FEDERAL SPONSORSHIP

This invention was made in part with United States Government support under a National Science Foundation grant CTS-0210840. The U.S. Government has certain rights in this invention.

FIELD OF THE INVENTION

This invention generally relates to the field of scanning probe microscopy, and more particularly relates a silicon cantilever with tip and a method of fabricating same.

BACKGROUND

Recently, short and thin cantilevers have been used for atomic force microscope (AFM) imaging and force measurement [D. A. Walters, J. P. Cleveland, N. H. Thomson, P. K. Hansma, M. A. Wendman, G. Gurley, V. Elings, Short cantilevers for atomic force microscopy, Rev. Sci. Instrum. 67, 3583 (1996); M. B. Viani, T. E. Schaffer, G. T. Paloczi, L. I. Pietrasanta, B. L. Smith, J. B. Thompson, M. Richter, M. Rief and H. E. Gaub, K. W. Plaxco, A. N. Cleland, H. G. Hansma, P. K. Hansma, Fast imaging and fast force spectroscopy of single biopolymers with a new atomic force microscope designed for small cantilevers, Rev. Sci. Instrum. 70, 4300 (1999)]. Such cantilevers have a high resonance frequency and a low force constant. The high resonance frequency allows for fast imaging [M. B. Viani, T. E. Schaffer, G. T. Paloczi, L. I. Pietrasanta, B. L. Smith, J. B. Thompson, M. Richter, M. Rief and H. E. Gaub, K. W. Plaxco, A. N. Cleland, H. G. Hansma, P. K. Hansma, Fast imaging and fast force spectroscopy of single biopolymers with a new atomic force microscope designed for small cantilevers, Rev. Sci. Instrum. 70, 4300 (1999); M. B. Viani, L. I. Pietrasanta, J. B. Thompson, A. Chand, I. C. Bebeshuber, J. H. Kindt, M. Richter, H. G. Hansma, P. K. Hansma, Probing protein-protein interactions in real time, Nat. Struct. Biol. 7, 644 (2000)], which is highly desirable for monitoring the reactions, interactions, and conformational changes of biomolecules. The low force constant of the cantilever greatly minimizes the deformation of soft samples such as biomolecules. In addition, it significantly increases the sensitivity of force measurement which has been widely used for studying the inter- and intra-molecular interactions between macromolecules [M. B. Viani, L. I. Pietrasanta, J. B. Thompson, A. Chand, I. C. Bebeshuber, J. H. Kindt, M. Richter, H. G. Hansma, P. K. Hansma, Probing protein-protein interactions in real time, Nat. Struct. Biol. 7, 644 (2000)]. Furthermore, it has been demonstrated that small cantilevers also reduce thermal noise [D. A. Walters, J. P. Cleveland, N. H. Thomson, P. K. Hansma, M. A. Wendman, G. Gurley, V. Elings, Short cantilevers for atomic force microscopy, Rev. Sci. Instrum. 67, 3583 (1996)]. All these unique advantages associated with small cantilevers have motivated the development of processes for the fabrication of such cantilevers and the instrumentation for using them.

Currently, AFM cantilevers are predominately fabricated from silicon and silicon nitride (SiN). Several reports for the fabrication of small cantilevers without tips using both materials appeared [T. D. Stowe, K. Yasumura, T. W. Kenny, D. Botkin, K. Wago, D. Rugar, Attonewton force detection using ultrathin silicon cantilever, Appl. Phys. Lett. 71, 288 (1997); J. Yang, T. Ono, M. Esashi, Mechanical behavior of ultrathin microcantilever, Sens. Actuator, A. 82, 102 (2000); A. Gupta, J. P. Denton, Helen McNally, R. Bashir, Novel fabrication method for surface micromachined thin single-crystal silicon cantilever beams, J Microelectromech. Syst. 12, 185 (2003)]. Among the few reports for the fabrication of small cantilevers with tips, most of them used low stress SiN as the material for the cantilevers because the thickness of SiN cantilevers can be controlled by chemical vapor deposition (CVD) and SiN is not etched in the etchants for silicon or silicon oxide [M. B. Viani, T. E. Schaffer, A. Chand, M. Rief, H. E. Gaub, P. K. Hansma, Small cantilevers for force spectroscopy of single molecules, J Appl. Phys. 86 2258 (1999)]. The SiN tips can be fabricated with SiN cantilevers together or carbon tips can be deposited on the SiN cantilevers by electron beam deposition [K. I. Schiffmann, Nanotechnology 4, 163 (1993)]. Although silicon cantilever tips are more difficult to fabricate compared to SiN cantilever tips, there are several advantages for the use of silicon tips and cantilevers: 1) Si tips can be easily sharpened through thermal oxidation; 2) Comparing with carbon tips deposited by electron beam deposition, the Si tips that are integrated with Si cantilevers are easier to be fabricated in large scale; 3) Si tips can be modified with protein-resistant monolayers for application of such tips for imaging biological samples [Yam, C. M., Lopez-Romero, J. M.; Gu, J.; Cai, C. "Protein-resistant monolayers prepared by hydrosilylation of □-oligo(ethylene glycol)-□-alkenes on hydrogen-terminated silicon (111) surfaces." Chem. Commun. 2510-2511 (2004); Yam, C. M.; Xiao, Z.; Gu, J.; Boutet, S.; Cai, C. "Modification of silicon AFM cantilever tips with an oligo (ethylene glycol) derivative for resisting proteins and maintaining a small tip size for high-resolution imaging." J. Am. Chem. Soc. 125, 7498-7499 (2003); Gu, J.; Yam, C. M.; Li, S.; Cai, C. "Nanometric protein arrays on protein-resistant monolayers on silicon surfaces." J. Am. Chem. Soc. 126, 8098-8099 (2004)]; 4) The single crystal Si cantilevers have a higher Q factor than the amorphous SiN cantilevers grown by CVD [Yam, C. M.; Xiao, Z.; Gu, J.; Boutet, S.; Cai, C. "Modification of silicon AFM cantilever tips with an oligo (ethylene glycol) derivative for resisting proteins and maintaining a small tip size for high-resolution imaging." J. Am. Chem. Soc. 125, 7498-7499 (2003)]; 5) At an appropriate thickness, the Si cantilevers thinner than 500 nm have as high as 70% reflectivity to red laser, which is a popular light source in commercial SPM heads. However, the corresponding SiN cantilevers only have up to 40% reflectivity to red laser. Moreover, if blue-violet laser is used in SPM heads, the reflectivity in thin Si cantilevers has almost no variation with thickness because the strong absorption of blue light nearly completely eliminates the thin film interference for Si. In contrast, SiN almost has no absorption to visible light.

Despite the advantages of using Si tips and cantilevers, few reports on the fabrication of thin Si cantilevers with Si tips and only one report on the fabrication of Si tips on SiN cantilevers appeared [R. J. Grow, S. C. Minne, S. R. Manalis, C. F. Quate, Silicon nitride cantilevers with oxidation-sharpened silicon tips for atomic force microscopy, J Microelectromech. Syst. 11, 317 (2002)]. This situation reflects the difficulties of fabricating thin Si cantilever tips. The commercial Si cantilever tips are mostly prepared by backside etching of 300-500 µm thick Si wafers. Due to the deviation of thickness over the whole wafer, and the difficulties in controlling the etching process, it is extremely difficult to prepare cantilevers thinner than 1 µm in a wafer scale by this process. The excellent performance of cantilever tips made of SiN with sizes similar to a few microns width, down to 100 nm in thickness, and around 10 µm in length has been demonstrated [M. B. Viani, T. E. Schaffer, G. T. Paloczi, L. I. Pietrasanta, B. L. Smith, J. B. Thompson, M. Richter, M. Rief and H. E. Gaub, K. W. Plaxco, A. N. Cleland, H. G. Hansma, P. K. Hansma, Fast imaging and fast force spectroscopy of single biopolymers with a new atomic force microscope designed for small cantilevers, *Rev. Sci. Instrum.* 70, 4300 (1999)]. However, to take advantage of such micron-sized cantilevers requires specially designed AFM heads that remain at the prototyping stage and are available in only a few research groups.

BRIEF DESCRIPTION OF THE INVENTION

Thin and short cantilevers possess both a low force constant and a high resonance frequency, which are highly desirable for atomic force microscope (AFM) imaging and force measurement. According to some embodiments, the present invention provides small silicon (Si) cantilevers integrated with Si tips, for example fabricated from SOI wafers. SOI wafers are used to reduce the variation of the cantilevers' thickness. In one example, the fabrication process provided SOI chips containing 40 silicon cantilevers integrating with an ultra-sharp Si tip. These tips produced images having a much higher resolution than the resolution produced by commercial tips. Also, these tips had a much lower force constant, which is more suitable for imaging soft samples, than those of commercial tips. The availability of such SOI chips greatly facilitates large scale modification of the silicon cantilever tips' surfaces. These tips can be modified with a monolayer of oligo (ethylene glycol) derivatives (see U.S. patent application Ser. No. 10/742,047) that resist the non-specific interactions with proteins, rendering them most suitable for imaging and measurement of biological samples.

The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a detailed understanding and better appreciation of the present invention, reference should be made to the following detailed description of the invention and the preferred embodiments, taken in conjunction with the accompanying drawings, wherein.

DETAILED DESCRIPTION OF THE INVENTION

The following discussion is presented to enable a person skilled in the art to make and use the invention. The general principles described herein may be applied to embodiments and applications other than those detailed below without departing from the spirit and scope of the present invention as defined by the appended claims. The present invention is not intended to be limited to the embodiments shown, but is to be accorded the widest scope consistent with the principles and features disclosed herein.

As such, those skilled in the art will appreciate that the conception, upon which this disclosure is based, may readily be utilized as a basis for the designing of other structures, methods, and devices for carrying out the several purposes of the present invention. It is important, therefore, that the claims be regarded as including such equivalent constructions insofar as they do not depart from the spirit and scope of the present invention.

Design:

The thin film interference effects can impact the optical monitoring of the microcantilever's motion because the intensity of reflection could be weakened by these effects. A layer of metal can be deposited on the back of the cantilever to eliminate this interference and provide a high reflectivity. However, the undesirable effect of the temperature sensitive "bimaterial" strips can become large for thin cantilevers if the thickness of metal layer is comparable to that of the cantilever. The interference, however, does not always have a negative effect. With the proper thickness, the reflective light can be strengthened by the interference. A computer simulation, based upon a matrix formulation of reflection and transmission at the dielectric material's interface, is used for calculating the reflection for thin film effect [E. Hecht, Optics $4^{th}$, *Pearson Education*, (2002)]. In the calculation, energy is conserved at the interface.

Figure 1:
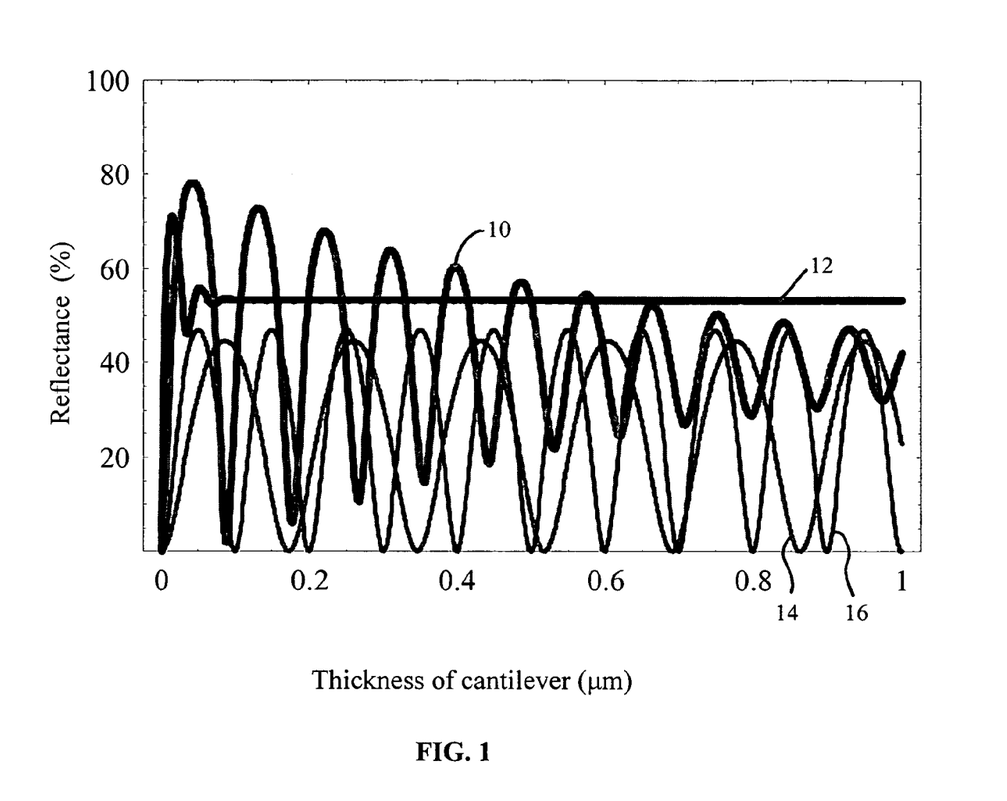
FIG. 1 shows the reflectance of Si and SiN cantilevers in red and blue light, produced from 670 nm red laser and 400 nm blue laser respectively.

FIG. 1 shows the simulation results of reflectivity from Si and SiN cantilevers in red and blue light. The optical parameters of Si and SiN are obtained from E. D. Palik, Handbook of optical constants of solids, *Academic Press,* (1985); S. M. Sze, Physics of semiconductor devices, *Wiley-Interscience*, (1969); A. Wig, A. Passian, E. Arakawa, T. L. Ferrell, T. Thundat, Optical thin-film interference effects in microcantilevers, *J. Appl. Phys.* 95, 1162 (2004). The simulation results show that a high reflectivity can be obtained if the cantilevers' thickness is accurately controlled within a proper range. For example, Si cantilevers with a thickness of approximately 110-160 nm have more than 70% reflectivity in red light (wavelength 670 nm), which is illustrated by the Si red laser curve 10. With a certain thickness, SiN cantilevers also possess the reflectivity larger than 40% in red light, as shown by the SN red laser curve 14, or blue light (wavelength 400 nm), as shown by the SiN blue laser curve 16. Here, Si cantilevers with a thickness larger than 10 nm show another advantage: the Si blue laser curve 12 illustrates that they always have a reflectivity around 50% in blue light. This phenomenon occurs because the strong absorption of blue light in Si eliminates the effect of thin film interference and the higher refraction index of Si in blue light leads to stronger reflection than in red light. Blue and violet lasers are increasingly becoming more reliable and are expected to be used in future AFM systems.

The cantilevers with a high resonance frequency and low force constant are highly desirable for imaging biological samples. Unfortunately, commercial Si AFM cantilevers are not satisfactory in this regard. For example, two typical silicon probes are commercially available: 1) the long cantilevers having a typical size of 300×35×1 μm, which provides a force constant of approximately 0.03 N/m and a resonant frequency of approximately 10 kHz, and 2) the relatively short cantilevers having a typical size of 90×35×1 μm, which provides a force constant of approximately 1.7 N/m and a resonant frequency of approximately 150 kHz. The long cantilevers are often used for imaging in contact mode or force measurement. For imaging soft samples, tapping mode, which eliminates the lateral force that often causes soft samples to deform, is preferred over contact mode. However, the low resonance frequency of these long cantilevers limits the imaging rate. For force measurement these large cantilevers inherently display relatively high thermal noise which greatly lowers the sensitivity of the force measurement. When using the relatively short cantilevers, the high force constant likely causes the soft samples to deform and it also increases the thermal noise. In the present invention, the silicon cantilever tips are designed to possess a high resonant frequency, have a low force constant and be compatible with commercial AFM instruments.

According to one embodiment of the present invention, the cantilever's width was kept the same as most commercial probes (approximately 35 μm), so that they would be compatible with the laser beam's size in a common AFM head The cantilevers' length (approximately 70 μm) was made to be twice the width's dimension. For rectangular cantilevers, the eigenfrequency $f_0$ is given by [C. J. Chen, Introduction to scanning tunneling microscopy, Oxford University Press, New York (1993)]

$$f_0 = 0.162 \frac{t}{l^2} \sqrt{\frac{E}{\rho}}, \quad (1)$$

where t is the cantilever's thickness, l is the cantilever's length, E is the material's Young's modulus and ρ is the material's density. The cantilever's spring constant is k=0.25 Ewt³/l³, where w is the cantilever's width.

Thus, for a 450 nm thick cantilever having a 35 μm width and a 70 μm length, the eigenfrequency is about 105 kHz and the force constant is about 0.25 N/m. The minimum detectable force [T. D. Stowe, K. Yasumura, T. W. Kenny, D. BOtlin, K. Wago, D. Rugar, Attonewton force detection using ultrathin silicon cantilevers, *Appl. Phys. Lett* 71, 288 (1997)] in a bandwidth B is $$F_{min} = \left(\frac{wt^2}{lQ}\right)^{1/2} (E\rho)^{1/4} (k_B TB)^{1/2}, \quad (2)$$

where Q is the quality factor and $k_B T$ is the thermal energy. In Yasumura's work [K. Y. Yasumura, T. D. Stowe, E. M. Chow, T. Pfafman, T. W. Kenny, B. C. Stipe, D. Rugar, Quality factors in micron- and submicron-thick cantilevers, *J. Microelectromech. Syst.* 9, 117 (2000)], Si cantilevers with similar size possess Q factors as high as $5\times10^4$ in the vacuum. The force noise spectral density of $2.3\times10^{-17}$ N/$\sqrt{Hz}$ can be obtained in the vacuum. Here, the tip's added mass was not included in the cantilever's mass when performing these calculations.

In an embodiment of the present invention, the tip's height is approximately 4-5 μm, which is much smaller than the commercial tip heights, which is approximately 15-20 μm. In the present invention, the fabrication process can form tip heights in the range of approximately 1-15 μm. Hence, the reduction of resonance frequency induced by the tip on the present invention's probes should be smaller than the commercial probes.

Microfabrication:

In one embodiment of the present invention, a method for fabricating a large number of Si cantilever tips using SOI wafers is described. This described method allows for fabricating cantilevers having a width in the range of approximately 1-50 μm, preferably about 20-30 μm, a thickness in the range of approximately 100 nm—less than 1 μm, preferably about 300 nm, and a length in the range of approximately 10-90 μm. This described method also allows for fabricating integrated Si tips having a height in the range of approximately 1-15 μm, preferably about 4-5 μm, and a size in the range of approximately 1-30 nm, preferably about 3-5 nm. The Si tip's size is defined as the diameter of a half-sphere located at the top of the Si tip, wherein the term "tip size" is a term used by those skilled in the art.

Figure 2A:
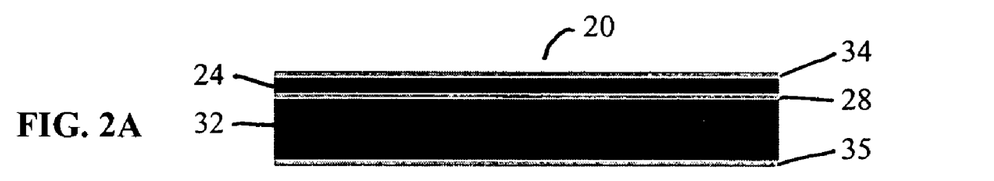
FIG. 2A shows a side view of a SOI wafer having Si layers and oxide layers.
Figure 2B:
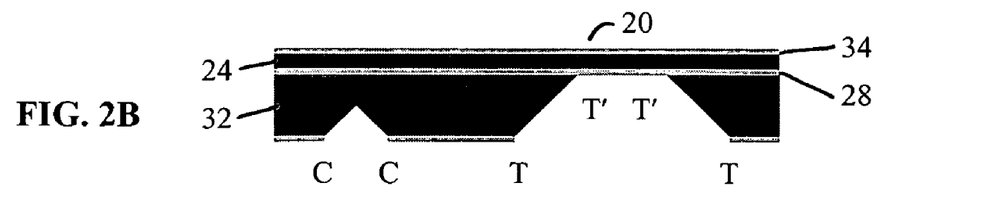
FIG. 2B shows a side view of a SOI wafer after etching to form the trenches and cleaving lines.
Figure 2C:
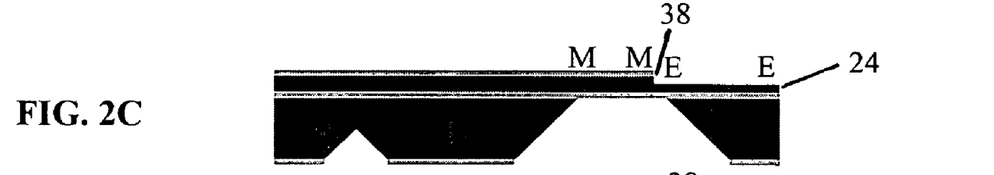
FIG. 2C shows a side view of a SOI wafer after forming the cantilever mesa.
Figure 2D:
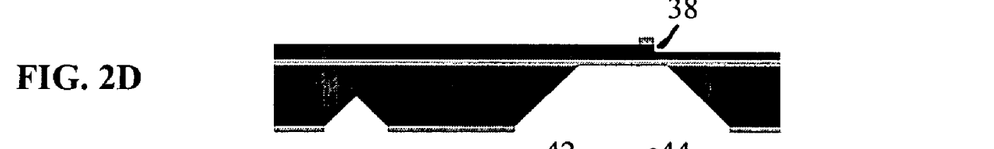
FIG. 2D shows a side view of a SOI wafer where the cantilever mesa and the Si section are etched together.
Figure 2E:
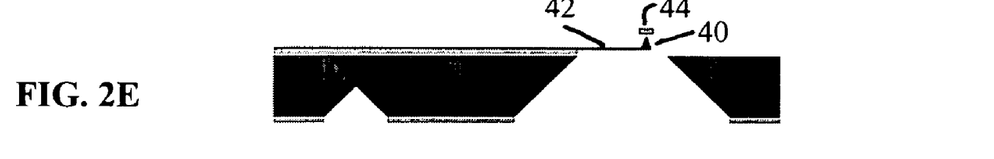
FIG. 2E shows a side view of a SOI wafer once etching has completely stopped.

FIGS. 2A-2E illustrate the schematic procedure of the AFM chip processing from an SOI wafer having Si layers and oxide layers. The Si layers consist essentially of silicon and may include trace amounts of dopants, which is in the ppm range. The fabrication process consists of three major steps: 1) forming the handle, 2) defining the cantilever and 3) forming the tip and cantilever together. FIG. 2A shows a silicon-on-oxide (SOI) wafer 20 with <100>orientation, which is used as the starting substrate. The device layer 24 of the SOI wafer 20 is used to form the tip 40 (FIG. 2E) and cantilever 42 (FIG. 2E). The uniformity of thickness is an extremely important factor in the fabrication of ultra thin cantilevers. Because the SOI wafer's 20 device layer 24 has a smaller variation of absolute thickness and is much thinner than the single crystal Si wafers (not shown), the cantilever's 42 (FIG. 2E) thickness can be much better controlled when they are fabricated from SOI wafers 20. The tip 40 (FIG. 2E) height is basically determined by the device layer's 24 thickness, hence the tip 40 (FIG. 2E) height can be controlled by varying the device layer's 24 thickness. The SOI wafer's 20 buried oxide (BOX) layer 28 provides the etch stop.

In this embodiment of the present invention, a 6-inch-diameter SOI wafer 20 with an approximately 5±0.5 μm device layer 24, an approximately 2 μm BOX layer 28 and an approximately 375 μm handle layer 32 was used. The SOI wafer 20 utilized a double side polish. The double side polish is performed to flatten the SOI wafer's device layer side and handle layer side. Although this embodiment used an SOI wafer which had a double side polish, only the device layer side can be polished without departing from the scope and spirit of the present invention. Also, the SOI wafers 20 used in this embodiment were bonded wafers, wherein the device layer 24 was doped with boron. The concentration of the dopant used is very small, typically in the ppm range. Although a boron dopant was used according to some embodiments of the present invention, it will be understood that the inventors contemplate that any common dopant known in the art may be used without departing from the scope and spirit of the present invention. Also, the inventors contemplate that the present invention may still be performed without using any dopants in the device layer.

The following describes the fabrication process leading to 40 AFM chips on an approximately 0.8×0.8 inch$^2$ SOI wafer. The results showed that the cantilever's 42 (FIG. 2E) thickness deviation in the 0.8×0.8 inch$^2$ area was about ±0.02 µm, which is much smaller than ±0.5 µm.

A. Etch Trenches and Cleaving Lines.

0.4 µm oxide layers 34,35 are grown at both sides of the wafer by thermal oxidation at about 1000° C. The function of these thermal oxide layers 34,35 is to work as a mask at handle layer 32 side and protect the device layer 24 when the trenches (T-T) and cleaving lines (C-C) are formed, as shown in FIG. 2B. The top thermal oxide layer 34 also works as a mask in the following steps to define the cantilever 42 (FIG. 2E) and form the tip 40 (FIG. 2E). The bottom side of the wafer is coated with a photoresist and the trenches (T-T) and cleaving lines (C-C) are transferred to the bottom side of the SOI wafer using conventional photolithographic techniques.

In this embodiment, buffered HF wet etching is used to open the window on the oxide layer 35 at the location of trenches (T-T) and cleaving lines (C-C). Tetra-methyl ammonium hydroxide (TMAH) is used to etch the Si handle layer 32 in this step. The reason for using TMAH rather than KOH is that the oxide layer is stable under TMAH, while KOH slowly etches the oxide layer. Although this embodiment uses TMAH for etching this Si handle layer, it will be understood that the inventors contemplate that other etching agents known in the art may be used without departing from the scope and spirit of the invention. It was determined that 0.4 µm oxide layers were thick enough to survive 12-hours etching at approximately 65° C., which was necessary for etching through the 375 µm-thick handle layer 32 to form the trenches stopped at the BOX layer 28.

After etching, the cleaving lines (C-C) had a V-groove shape in the cross-section, leaving about 170 µm thick handle layer 32 unetched. This design of the cleaving lines (C-C) ensures the robustness of the wafers in the subsequent processing and relatively easy cleavage of the AFM chips from the wafer at the last step. Now in the trench area, only a thin membrane was left, consisting of a 0.4 µm top oxide layer 34, a 5 µm device layer 24 and a 2 µm BOX layer 28. To avoid the damage of the membrane in the subsequent processing, the SOI wafer 20 was then stuck onto a common Si wafer (not shown).

B. Define the Cantilever.

Before defining the location of cantilever 42 (FIG. 2E), a 20 µm wide line across the trench area was patterned on the device layer 24 side and etched throughout the membrane using conventional photolithographic technique for double side alignment. In this way, the edges of trench (T'-T') can be seen from the device layer 24 side and the location of cantilever 42 (FIG. 2E) can be determined. Although this embodiment utilizes the above-stated process to allow the trench edges (T'-T') to be seen from the device layer 24 side, other processes known to those skilled in the art may be used without departing from the scope and spirit of the present invention.

A 50% aqueous solution of KOH was used to etch the cantilever 42 (FIG. 2E) in a 60° C. water bath. Trace antimony oxide was added for uniform etching with an rms roughness of below 2 nm [C. Mihalcea, A. Holz, M. Kuwahara, J. Tominaga, E. Oesterschulze, N. Atoda, Improved anisotropic deep etching in KOH-solutions to fabricated highly specular surfaces, *Microelect. Eng.* 57-58, 781 (2001)]. Although this embodiment utilizes a 50% aqueous solution of KOH with trace amounts of antimony oxide for etching, other etching mixtures, which etch uniformly and result in an rms roughness of below 2 nm, may be used in this step without departing from the scope and spirit of the present invention.

In this cantilever definition step, as illustrated in FIG. 2C, only about 0.5 µm Si was etched in the device layer 24 to form the 0.5 µm thick cantilever mesa 38. FIG. 2D illustrates the next step, wherein the cantilever mesa 38 (M-M) and the already etched part (E-E), shown in FIG. 2C, are etched together. The reason for etching the 0.5 µm cantilever mesa 38 and then releasing the cantilever 42 (FIG. 2E) while forming the tip 40 (FIG. 2E) together is that the membrane needs to keep strong enough before patterning the tip disk. If the membrane is etched throughout, but not just a mesa, the only cantilever part can not stand up well in the following processing, for example spinning photoresist, and the stress at interface of device layer and BOX layer can distort the cantilever seriously to lead to the alignment between cantilevers and tip disks impossible.

C. Formation of Tip and Cantilever.

A 10 µm disk was patterned at the end of each defined cantilever 42 (FIG. 2E). This disk is used to define an oxide cap located on top of the Si tip. The same recipe of the etchant in the step of defining the cantilever was also used in the formation of the tip and cantilever. Although this embodiment utilizes a 50% aqueous solution of KOH with trace amounts of antimony oxide for etching, other etching mixtures, which etch uniformly and result in an rms roughness of below 2 nm, may be used in this step without departing from the scope and spirit of the present invention. The M-M and E-E parts in FIG. 2C were etched together at the same etching rate. As seen in FIG. 2E, when the E-E part was etched off totally, the etching was stopped at once. The cantilever 42 and tip 40 were formed together in this step. The etching rate of this recipe was about 250 nm per minute, so it was not difficult to control the variation of the thickness of cantilever 42 in several tens of nanometers for the different batch of sample. Although the preferred embodiment utilized an etching rate of about 250 nm per minute, other etching rates may be used, so long as the thickness variation is controllable, without departing from the scope and spirit of the present invention. Typically, lower etching rates allow for the temperatures to be controlled, which thereby allows the thickness to be controlled.

Figure 3A:
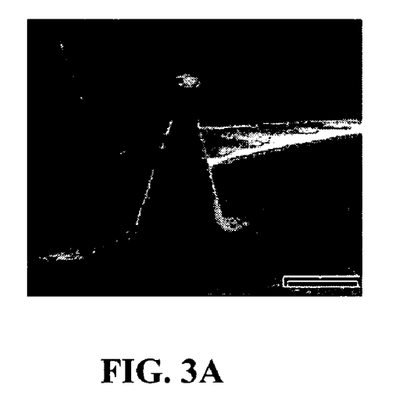
FIG. 3A shows an SEM image of an AFM probe's tip after etching, wherein the scale bar is 1 µm.

At this moment, there was still an oxide cap 44 above the tip 40 and the connecting area was about 200 nm in diameter. FIG. 3A shows an SEM image of an AFM probe's tip after etching, wherein the scale bar is 1 µm. The shape of the tips are shown to be a sharp pyramid. From crystallographic analysis, the etched plane was probably (411) plane. This sharp pyramid perhaps is owing to the high concentration of the KOH solution [I. Zubel, Silicon anisotropic etching in alkaline solution III: on the possibility of spatial structures forming in the course of Si(100) anisotropic etching in KOH and KOH+IPA solutions, *Sens. Actuator, A* 84, 116 (2000)].

An HF solution is used to etch out the buried oxide layer, located immediately below the cantilever, and the oxide cap.

Before the oxidation, the thickness of the cantilever is checked by SEM. The time of oxidation was determined by the data from SEM and the proper time could be obtained by calculating the consumption of Si by the oxidation. At last thermal oxidation was used for following reasons: 1) reduce and control the thickness of the cantilever; 2) sharpen the tip [C. Liu, R. Gamble, Mass-producible monolithic silicon probes for scanning probe microscopes, *Sens. Actuator, A* 71, 233 (1998) ]and 3) balance the stress at both side of the cantilever to reduce bending of the cantilever. The thickness is relatively easy to control in this step because the oxidation needs several hours in general. The rate of cooling down in the thermal oxidation was controlled for reducing stress in the cantilevers. In this embodiment, the temperature was decreased from about 1000° C. to about room temperature in about 2 hours. The cool down rate was about 8.2° C./minute. Although this embodiment used a cool down rate of about 8.2° C./minute, other cool down rates that reduce the stress on the cantilever can be used without departing from the scope and spirit of the present invention.

Figure 3B:
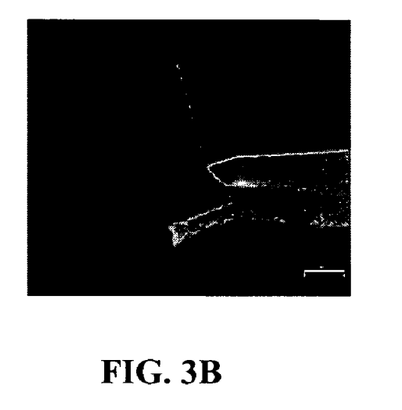
FIG. 3B shows an SEM image of an AFM probe's tip after oxidation for controlling the thickness, wherein the scale bar is 1 µm.
Figure 3C:
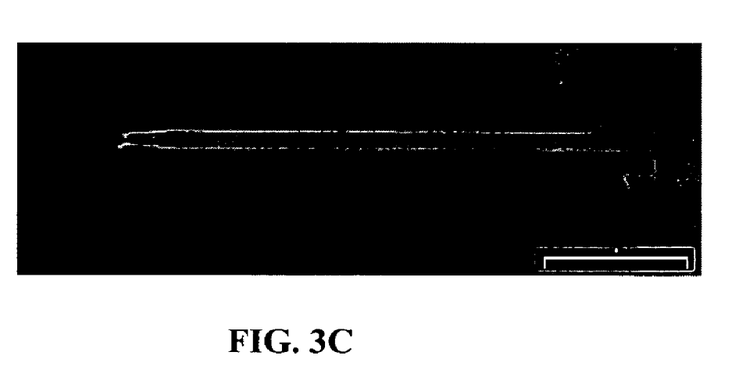
FIG. 3C shows an SEM image of an AFM probe's tip and cantilever after oxidation for controlling the thickness, wherein the scale bar is 20 µm.

FIG. 3B shows an SEM image of an AFM probe's tip after oxidation for controlling the thickness, wherein the scale bar is 1 μm. FIG. 3C shows an SEM image of an AFM probe's tip and cantilever after oxidation for controlling the thickness, wherein the scale bar is 20 μm.

Measurement:

The performance of the cantilever tips was evaluated by imaging oligo (ethylene glycol) (OEG) terminated monolayers on atomically flat silicon (111) surfaces. Such monolayers were recently developed by us for resisting non-specific adsorption of proteins on silicon surfaces [Yam, C. M.; Lopez-Romero, J. M.; Gu, J.; Cai, C. "Protein-resistant monolayers prepared by hydrosilylation of □-oligo(ethylene glycol)-□-alkenes on hydrogen-terminated silicon (111) surfaces." *Chem. Commun.* 2510-2511 (2004); Yam, C. M.; Xiao, Z.; Gu, J.; Boutet, S.; Cai, C. "Modification of silicon AFM cantilever tips with an oligo(ethylene glycol) derivative for resisting proteins and maintaining a small tip size for high-resolution imaging." *J. Am. Chem. Soc.* 125, 7498-7499 (2003); Gu, J.; Yam, C. M.; Li, S.; Cai, C. "Nanometric protein arrays on protein-resistant monolayers on silicon surfaces." *J. Am. Chem. Soc.* 126, 8098-8099 (2004)]. These films were prepared by surface hydrosilylation of α-hepta-(ethylene glycol) methyl ω-undecenyl ether ($EG_7$) on hydrogen terminated Si (111) surfaces, leading to an OEG-terminated monolayer directly bonded to the silicon surfaces via Si—C bonds. These protein-resistant films were employed as a new platform for generating nanoscale patterns by conductive AFM [Gu, J.; Yam, C. M.; Li, S.; Cai, C. "Nanometric protein arrays on protein-resistant monolayers on silicon surfaces." *J. Am. Chem. Soc.* 126, 8098-8099 (2004)], which serve as templates for generating protein nanoarrays on the surfaces. For this purpose, highly homogenous and atomically flat film surfaces are desirable. The materials and deposition conditions were optimized to improve the film quality. AFM is used to examine the films and provide feedback to the optimization.

Figure 4A:
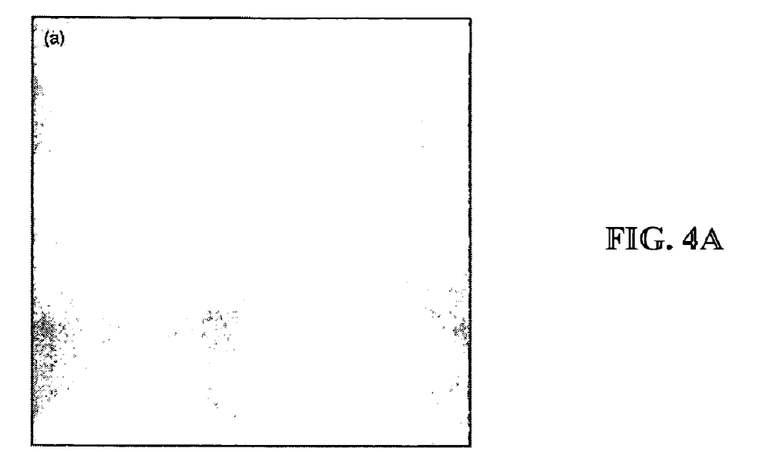
FIG. 4A shows the AFM images (500×500 nm) of an OEG-terminated monolayer obtained with a commercial silicon cantilever tip in contact mode.
Figure 4B:
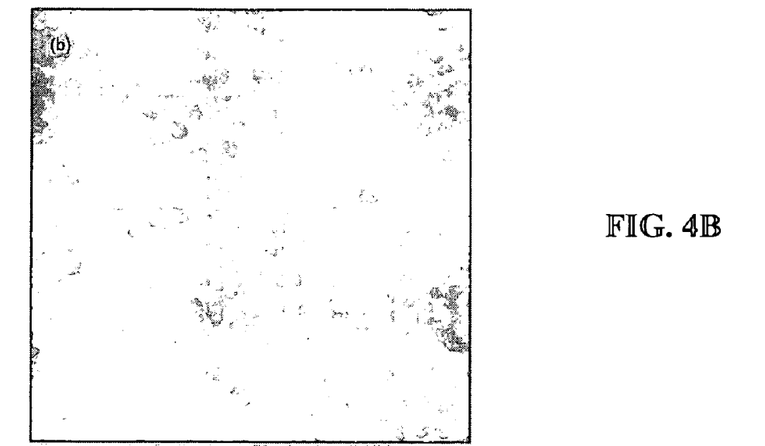
FIG. 4B shows the AFM images (500×500 nm) of an OEG-terminated monolayer obtained with a commercial silicon cantilever tip in tapping mode.

Initially, the films were imaged with contact mode AFM, revealing the atomic steps of the substrate surface underlying the monolayer. A typical contact mode AFM image of the films is shown in FIG. 4A. Later on, tapping mode AFM was used under light tapping conditions to inspect the films. Surprisingly, it was found that grain structures were present on the monolayers. A typical tapping mode image obtained with a commercial silicon AFM cantilever tip is shown in FIG. 4B. The grain structures could not be revealed by contact mode AFM even with a low loading force, indicating that the grain structures were very soft. It was speculated that the grain structures were probably domains where the density of the absorbed molecules and/or the absorbed water was higher than their surroundings. To gain insight into the nature and the origin of the grain structures, high-resolution images were needed. Due to the soft nature of these structures, the images should be obtained with a very soft cantilever.

Figure 4C:
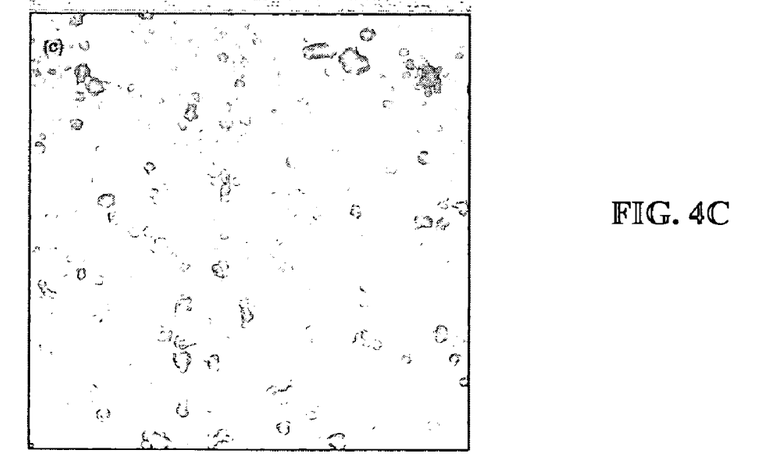
FIG. 4C shows the AFM images (500×500 nm) of an OEG-terminated monolayer obtained with a short and thin cantilever tip fabricated using the method described above.

A typical image obtained with a silicon cantilever tip fabricated by the above method is shown in FIG. 4C. The resolution of this image was much better than those obtained with the best commercial silicon cantilever tips that were tested thus far. The results indicated that the silicon tips fabricated by the present invention's method were very sharp. Since the feature size in FIG. 4C is smaller than 5 nm, the tip size was expected to be similar to approximately 3-5 nm. As shown by the SEM images, the thickness, width, and length of the cantilever are approximately 0.45, 35 and 70 μm, respectively. The cantilever's force constant is then calculated to be approximately 0.25 N/m (see above) and the measured resonant frequency was approximately 102 kHz, which is in close agreement with the calculated value of approximately 105 kHz. In comparison, the force constant for commercial silicon cantilever tips with a similar resonant frequency is typically approximately 1.7 N/m. Therefore, the cantilever tips, fabricated from the methods of the present invention, represent a seven-fold reduction of the force applied to the sample.

According to some embodiments, the present invention provides Si AFM probes having cantilevers thinner than 1 μm from SOI wafers and a method for fabricating same. The method was tested to fabricate 40 devices on one 0.8×0.8 $inch^2$ area. The Si AFM probes possessed a relatively high resonant frequency, approximately 102 kHz, a low force constant, approximately 0.25 N/m, and provided higher imaging resolutions. The large-scale modification of these silicon devices will be done with a monolayer presenting protein-resisting OEG for biological applications.

Conclusion:

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. It is therefore, contemplated that the claims will cover any such modifications or embodiments that fall within the true scope of the invention.

What is claimed is:

1. An AFM scanning probe comprising:
   a) a cantilever; and
   b) a tip integrally formed on the cantilever, wherein the tip extends in a substantially perpendicular direction to the longitudinal axis of the cantilever, and wherein the tip consists essentially of silicon, wherein the thickness of the cantilever is in the range of from about 100 to about 1000 nanometers.

2. The AFM scanning probe of claim 1, wherein the cantilever consists essentially of silicon.

3. The AFM scanning probe of claim 1, wherein the height of the tip is in the range of from about 1 to about 15 microns.

4. The AFM scanning probe of claim 3, wherein the height of the tip is in the range of from about 4 to about 5 microns.

5. The AFM scanning probe of claim 1, wherein the size of the tip is in the range of from about 1 to about 30 nanometers.

6. The AFM scanning probe of claim 5, wherein the size of the tip is in the range of from about 3 to about 5 nanometers.

7. The AFM scanning probe of claim 1, wherein the thickness of the cantilever is about 300 nanometers.

8. The AFM scanning probe of claim 1, wherein the length of the cantilever is in the range of from about 10 to about 90 microns.

9. The AFM scanning probe of claim 1, wherein the width of the cantilever is in the range of from about 1 to about 50 microns.

10. The AFM scanning probe of claim 9, wherein the width of the cantilever is in the range of from about 20 to about 30 microns.

11. The AFM scanning probe of claim 1, wherein each of the cantilever and the tip further comprise a dopant.

12. The AFM scanning probe of claim 1, wherein the AFM scanning probe is made by a method comprising forming both the cantilever and the tip from an SOI wafer.

13. The AFM scanning probe of claim 1, wherein the force constant of the cantilever is about 0.25 N/m.

14. The AFM scanning probe of claim 1, wherein the resonant frequency of the cantilever is about 102 kHz.

15. The AFM scanning probe of claim 14, wherein the force constant of the cantilever is about 0.25 N/m.

16. An AFM scanning probe comprising:
a) a cantilever; and
b) a tip integrally formed on the cantilever, wherein the tip extends in a substantially perpendicular direction to the longitudinal axis of the cantilever, and wherein the tip consists essentially of silicon, wherein the force constant of the cantilever is about 0.25 N/m.

17. An AFM scanning probe comprising:
a) a cantilever; and
b) a tip integrally formed on the cantilever, wherein the tip extends in a substantially perpendicular direction to the longitudinal axis of the cantilever, and wherein the tip consists essentially of silicon, wherein the resonant frequency of the cantilever is about 102 kHz.

18. An AFM scanning probe comprising:
a) a cantilever consisting essentially of silicon; and
b) a tip integrally formed on the cantilever, wherein the tip extends in a substantially perpendicular direction to the longitudinal axis of the cantilever, wherein the tip consists essentially of silicon and wherein the height of the tip is in the range of from about 4 to about 5 microns, and wherein the size of the tip is in the range of from about 3 to about 5 nanometers, wherein the force constant of the cantilever is about 0.25 N/m.

19. An AFM scanning probe comprising:
a) a cantilever consisting essentially of silicon; and
b) a tip integrally formed on the cantilever, wherein the tip extends in a substantially perpendicular direction to the longitudinal axis of the cantilever, wherein the tip consists essentially of silicon and wherein the height of the tip is in the range of from about 4 to about 5 microns, and wherein the size of the tip is in the range of from about 3 to about 5 nanometers, wherein the resonant frequency of the cantilever is about 102 kHz.

* * * * *

UNITED STATES PATENT AND TRADEMARK OFFICE
CERTIFICATE OF CORRECTION

PATENT NO. : 7,637,960 B2
APPLICATION NO. : 11/599726
DATED : December 29, 2009
INVENTOR(S) : Cai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 431 days.

Signed and Sealed this

Ninth Day of November, 2010

David J. Kappos
*Director of the United States Patent and Trademark Office*